Sept. 10, 1940.　　　　M. GOTTLIEB　　　　2,214,459
PRESSURE REGULATING VALVE
Filed April 30, 1938

WITNESSES:
James F. Mosser
E. H. Lutz

INVENTOR
MANIOUS GOTTLIEB.
BY
A. B. Reeves
ATTORNEY

Patented Sept. 10, 1940

2,214,459

UNITED STATES PATENT OFFICE 2,214,459

PRESSURE REGULATING VALVE

Manious Gottlieb, Philadelphia, Pa., assignor to Westinghouse Electric & Manufacturing Company, East Pittsburgh, Pa., a corporation of Pennsylvania Application April 30, 1938, Serial No. 205,215

5 Claims. (Cl. 251—145)

My invention relates to pressure-regulating valves and it has for an object to provide apparatus of this character which shall be economical to manufacture and which shall be operative to maintain a desired regulated pressure while, at the same time, being responsive to small changes in pressure to provide for close and accurate regulation.

Heretofore, pressure-regulating valves have frequently been of the relief valve type, which are objectionable, not only on account of excessive friction but also for the reason that the requisite force or pressure to maintain a desired fluid pressure is usually had with sacrifice of sensitive response and then again, many valves of this type are subject to errors on account of changes in flow conditions or viscosity of the fluid. Therefore, I provide a cup valve having a relatively thin lip so that the flow passage thereof constitutes a circumferentially-extending orifice of the sharp-edge type; and, in addition, the requisite closing force of the valve is secured by means of a spring of the U type which is capable, not only of exerting the desired force for this purpose, but, at the same time, of providing sufficient deflection so as to be highly responsive to pressure changes. Not only does the cup valve operate without material mechanical friction, but friction is furthermore minimized because of the character of spring used, the relative arrangement of parts, and the universal connection between one end of the spring and the cup valve. An adjustable abutment associated with the end of the spring remote from the cup valve provides for regulation of the pressure. Not only does the arrangement have the advantages indicated, but it is economical to construct, as relatively few parts are employed and machining is minimized, the only accurate fit required being that between the seat and the cup valve; and, as a universal connection is preferably provided between the spring and the cup valve, it is only required that the edge of the cup valve lip and the seat shall be in planes.

A further object of my invention is to provide a pressure-regulating valve including a body having a fluid pressure passage communicating with a chamber together with a cup valve covering the passage, an adjustable abutment carried by the body, and a spring of the U type in the chamber and having its ends arranged between the abutment and the cup valve.

A further object of my invention is to provide a pressure-regulating valve having a body formed with a fluid passage communicating with a chamber having a flat annular valve seat encompassing the passage and which cooperates with a relatively thin annular lip of a cup valve, together with an abutment extending into the chamber and adjustable externally of the body to vary the distance between its inner end and the cup valve axially aligned therewith and a spring of the U type having its ends arranged between the abutment and the cup valve.

A further object of my invention is to provide a pressure-regulating valve including a cup valve urged toward its seat by means of a spring of the U leaf type, the ends of the spring being arranged between an adjustable abutment and the cup valve and the legs of the spring diminishing in cross-sectional area from the junction region towards the ends thereof.

These and other objects are effected by my invention as will be apparent from the following description and claims taken in connection with the accompanying drawing forming a part of this application, in which:

Figure 1:
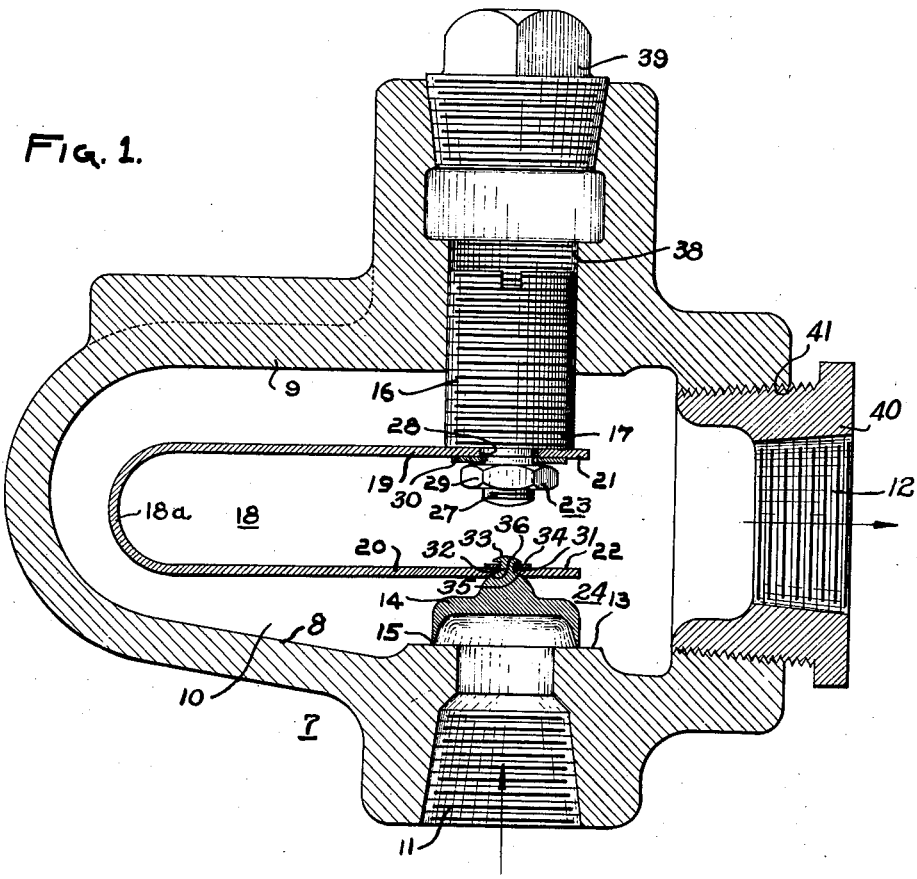
Fig. 1 is a sectional view showing my improved pressure regulating valve.
Figure 2:
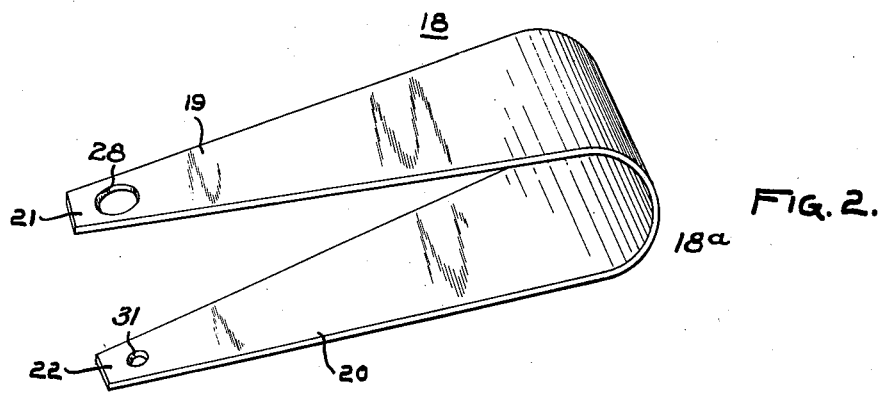
Fig. 2 is a view showing a modified form of spring.

Referring to the drawing more in detail, in Fig. 1, there is shown a body, at 7, comprising walls, including the opposed walls 8 and 9, defining a chamber 10. The body has fluid inlet and outlet openings 11 and 12 extending through walls thereof, the inlet opening 11 extending through the wall 8 whose inner surface is formed to provide the valve seat 13 about the discharge end of the inlet opening.

A cup valve 14 has a relatively thin lip 15, preferably annular, cooperating with the seat 13 to provide a circumferentially extending orifice of the sharp-edge type.

A threaded abutment or stem 16 is carried by the wall 9 of the body, the abutment having its inner end 17 extending into the chamber and being adjustable externally of the body to vary the distance between the inner end and the cup valve.

A leaf spring, at 18, of the hairpin or U type is arranged in the chamber 10 and it has approximately parallel arms 19 and 20 joined by the bent portion 18a, and, opposite to the bent portion, the arms have the terminal portions 21 and 22 thereof connected, at 23 and 24, respectively, to the stem 16 and to the cup valve 14. With this arrangement, the stem acts compressively on the leaf spring to cause the latter to exert seating or closing pressure on the valve.

The fact that the spring is constituted by leaf member parallel portions of suitable length assures of a closing force of desired magnitude with adequate response to small pressure changes, that is, even though the closing or seating force is rather high, yet, by choice of arms of suitable length, sensitiveness to small pressure changes is preserved. The valve movement is effected with a minimum of friction, the necessary movement being largely provided for by distributed flexure of the arms, the fact that the spring is of the leaf type assuring of stiffness and stability in directions parallel to the plane of the seat with the result that the spring has no relative sliding of component parts thereof or of guiding or holding structure therefor.

The connection, at 23, is comprised by a stem 27 extending through the somewhat larger opening 28 formed in the terminal portion 21, a nut 29 and a washer 30 retaining the spring relatively to the stem to provide a free swivel connection.

The connection, at 24, includes an opening 31 formed in the terminal portion 22 of the lower arm 20 and through which the valve tenon 32 extends, the latter having a head 33 with a washer 34 arranged between the head and the arm 20. As shown in Fig. 1, the tenon 32 springs from a ball portion 35 fitting a spherical seat or cavity 36 bordering the opening 31 at the lower side of the arm 20, the ball-and-socket joint so formed providing for tilting of the cup valve relatively to the lower arm 20 to assure of proper seating relation of the cup valve and the seat.

Adjustment of the spring force is effected by adjustment of the abutment or stem 16. To this end, the body, at 7, has a bore 38 extending through a wall thereof, the bore being internally threaded to engage external threads of the abutment. Preferably, the bore 38 has a plug 39 closing its outer end. Whenever the spring is to be adjusted the plug 39 is removed and a suitable tool is applied to the abutment 16 to secure the desired spring tension adjustment.

With the larger type of pressure-regulating valves, the spring 18 preferably has the arms thereof 19 and 20 tapered from the bent portion 18a toward the ends thereof so as to provide a maximum of deflection without undue concentration of stress at any point, that is, an attempt is made to secure arms 19 and 20 wherein deflection occurs throughout the lengths thereof in an approximately uniform manner. While the tapered construction is desirable with valves of the large type, or valves used with high pressures, for ordinary conditions, the spring may be of uniform section.

The chamber 10 is preferably elongated to conform, in general, to the spring, at 18. Furthermore, the outlet opening 12 is preferably at one end of the chamber to facilitate assembly, the aggregate comprising the spring, at 18, and the cup valve 14 being inserted through the opening to bring the opening 28 in the arm 19 into position to receive the tenon 27, whereupon the nut 29 and the washer 30 are assembled. To provide an opening of sufficient size, the opening 12 is preferably formed in a ferrule 40 having threaded connection with respect to an opening 41 of a size adequate to make it easier to insert the spring and valve aggregate and to attach the spring to the abutment or pin.

From the foregoing it will be apparent that I have provided a pressure-regulating valve of economical construction and wherein friction is minimized, the desired closing force may be exerted with preservation of sensitive response and relief of pressure may be secured in such accurate manner as to provide a fine degree of regulation. By the use of a spring of the U-type, it is assured that desired closing force with sensitive response may be had. Furthermore, a U spring arranged between and engaging a suitable abutment and the valve assures of an arrangement wherein there are no sliding parts that could cause excessive friction, any friction or unbalanced force being minimized by having the spring abutment aligned with the valve; and friction is further minimized by the provision of a universal connection between the valve and the spring. In order that changes in conditions of flow, viscosity, or other physical characteristic of the fluid may not impair responsiveness of the valve to maintain a desired pressure, not only is a cup valve used, but a valve of this type having a relatively thin lip cooperating with the seat to provide a circumferentially-extending orifice of the sharp-edge type. Furthermore, the cup valve has the advantage that a seat of extensive area may be provided therefor with the result that it does not necessitate a definite seating position, in consequence of which it may be held operatively in position by means of the spring, the latter, in turn, being connected to the abutment. In this connection, the chamber 10 is preferably elongated so as to conform to the spring, whereby the chamber, together with the abutment assures of support and confinement of the spring so that the cup valve is held in operative position.

While I have shown my invention in different forms, it will be obvious to those skilled in the art that it is not so limited but is susceptible of various other changes and modifications without departing from the spirit thereof, and I desire, therefore, that only such limitations shall be placed thereupon as are imposed by the prior art or as are specifically set forth in the appended claims.

What I claim is:

1. In a pressure-regulating valve, a body member having walls, including opposed first and second walls, defining an interior chamber; said body member having fluid inlet and outlet openings extending through walls thereof with the inlet opening extending through said first wall and the portion of the interior surface of the latter bounding the discharge end of the inlet opening providing a valve seat; a valve arranged internally of said chamber and cooperating with said seat; a hairpin spring arranged internally of the chamber; said spring having a bent portion joining first and second arms disposed adjacent to said first and second walls and the arms having first and second terminal portions opposite to the bent portion; a first connection between said first terminal portion and the valve and providing for the latter being positioned and carried by the spring; a second connection between said second terminal portion and said second wall and providing for the spring and the valve being positioned and carried by the latter; said second connection including a stem in an opening in said second wall and having its inner end extending into the chamber and connected to said second terminal portion and means providing for longitudinal adjustment of the stem to vary the spacing between said terminal portions to vary the seating force exerted by the spring on the valve.

2. In a pressure-regulating valve, a body member having walls, including first and second opposed walls, defining an interior chamber; said body member having fluid inlet and outlet openings extending through walls thereof with the inlet opening extending through said first wall and the portion of the interior surface of the latter bounding the discharge end of the inlet opening providing a valve seat; a valve arranged internally of said chamber and cooperating with said seat; a hairpin spring arranged internally of the chamber; said spring having a bent portion joining first and second arms disposed adjacent to said first and second walls and the arms having first and second terminal portions opposite to the bent portion; a first connection between said first terminal portion and the valve and providing for attachment of the valve and spring as an aggregate so that the valve may be positioned and carried by the spring; a second connection between the second terminal portion and said second wall and providing for the spring and the valve being positioned and carried by the latter; said second connection including a stem swiveled to the second terminal portion and having threaded engagement with respect to an opening extending through the second wall to provide for variation of the spacing between the first and second terminal portions to vary the seating force exerted on the valve by the spring.

3. In a pressure-regulating valve, a body member having walls, including opposed first and second walls, defining an interior chamber; said body member having fluid inlet and outlet openings extending through walls thereof with the inlet opening extending through said first wall and the portion of the interior surface of the latter bounding the discharge end of the inlet opening providing a valve seat; a cup valve arranged internally of said chamber and having a circumferentially extending sharp edge cooperating with said seat; a hairpin leaf spring arranged internally of the chamber; said spring having a bent portion joining first and second arms disposed adjacent to said first and second walls and the arms having first and second terminal portions opposite to the bent portion; a first connection between said first terminal portion and the valve and providing for the latter being positioned and carried by the leaf spring; and a second connection between the second terminal portion and said second wall and providing for the leaf spring and the valve being positioned and carried by the latter; said first connection including a joint between the first terminal portion and the cup valve and providing for the latter tilting relatively to the first terminal portion to assure proper seating relation of the valve and the seat; said second connection including a stem threaded with respect to an opening extending through said second wall and providing for adjustment of the spacing between the first and second terminal portions in order to adjust the seating force exerted on the valve by the spring.

4. In a pressure-regulating valve, a body member having walls, including opposed first and second walls, defining an interior elongated chamber; said body member having fluid inlet and outlet openings extending through walls thereof with the inlet opening extending through said first wall and the portion of the interior surface of the latter bounding the discharge end of the inlet opening providing a flat valve seat and with the outlet opening extending through an end wall of the chamber; a cup valve arranged internally of the chamber and having a circumferentially extending sharp edge cooperating with said seat; a hairpin leaf spring arranged internally of the chamber and extending lengthwise thereof; said spring having a bent portion joining first and second arms disposed adjacent to said first and second walls and the arms having first and second terminal portions opposite to the bent portion; a first connection between the first terminal portion and the valve and providing for the latter being positioned and carried by the leaf spring; and a second connection between the second terminal portion and said second wall and providing for the leaf spring and the valve being positioned and carried by said second wall; said first connection including an opening formed in the first terminal portion, a tenon spring from the valve and extending through the opening, a head on the tenon for holding the valve and the spring together as an aggregate, and means providing a ball-and-socket joint between the first terminal portion and the valve and including ball-and-socket elements formed thereon so as to be coaxial with the tenon.

5. In a pressure-regulating valve, a body member having walls, including opposed first and second walls, defining an interior elongated chamber; said body member having fluid inlet and outlet openings extending through walls thereof with the inlet opening extending through said first wall and the portion of the interior surface of the latter bounding the discharge end of the inlet opening providing a flat valve seat and with the outlet opening extending through an end wall of the chamber; a cup valve arranged internally of the chamber and having a circumferentially extending sharp edge cooperating with said seat; a hairpin leaf spring arranged internally of the chamber and extending lengthwise thereof; said spring having a bent portion joining first and second arms disposed adjacent to said first and second walls and the arms having first and second terminal portions opposite to the bent portion; a first connection between the first terminal portion and the valve and providing for the latter being positioned and carried by the leaf spring; and a second connection between the second terminal portion and said second wall and providing for the leaf spring and the valve being positioned and carried by said second wall; said first connection including an opening formed in the first terminal portion, a tenon springing from the valve and extending through the opening, a head on the tenon for holding the valve and the spring together as an aggregate, and means providing a ball-and-socket joint between the first terminal portion and the valve and including ball-and-socket elements formed thereon so as to be coaxial with the tenon; said second connection including a stem threaded in an opening provided in said second wall and a swivel between the inner end of the stem and said second terminal portion.

MANIOUS GOTTLIEB.